United States Patent [19]

Segura et al.

[11] 3,974,096
[45] Aug. 10, 1976

[54] WATER GAS SHIFT CATALYST

[75] Inventors: Marnell A. Segura; Clyde L. Aldridge; Kenneth L. Riley; Lloyd A. Pine, all of Baton Rouge, La.

[73] Assignee: Exxon Research and Engineering Company, Linden, N.J.

[22] Filed: Nov. 22, 1974

[21] Appl. No.: 526,306

Related U.S. Application Data

[62] Division of Ser. No. 235,178, March 16, 1972, abandoned.

[52] U.S. Cl. .............................. 252/439; 252/441; 252/442; 252/443; 252/464; 252/465; 252/466 J; 252/467; 252/470; 252/476; 423/656
[51] Int. Cl.² .................... B01J 27/04; B01J 27/10
[58] Field of Search .......... 252/441, 442, 464, 465, 252/466 J, 476, 439, 443, 470, 467; 423/654, 655, 656

[56] References Cited
UNITED STATES PATENTS 3,345,136  10/1967  Finneran et al. .................... 423/656
3,529,935  9/1970  Lorenz et al. ........................ 423/656
3,544,650  12/1970  Garwood ........................ 252/442 X Primary Examiner—W. J. Shine
Attorney, Agent, or Firm—John W. Ditsler

[57] ABSTRACT

Hydrogen is produced by reacting carbon monoxide with steam at a temperature of at least 200°F. in the presence of a supported catalyst containing: (1) at least one alkali metal compound derived from an acid having an ionization constant below $1 \times 10^{-3}$, (2) a metallic hydrogenation-dehydrogenation material, and (3) a halogen moiety. The ratio of metal component to alkali metal compound, each calculated on the basis of the oxide thereof, ranges from 0.0001 to about 10 parts by weight per part by weight of the alkali metal compound. The halide constituent is present in amounts in excess of about 0.01 weight %, based on total catalyst. A preferred catalyst composition comprises potassium carbonate, a mixture of cobalt and molybdenum oxides and combined chlorine contained on an alumina support.

6 Claims, 2 Drawing Figures

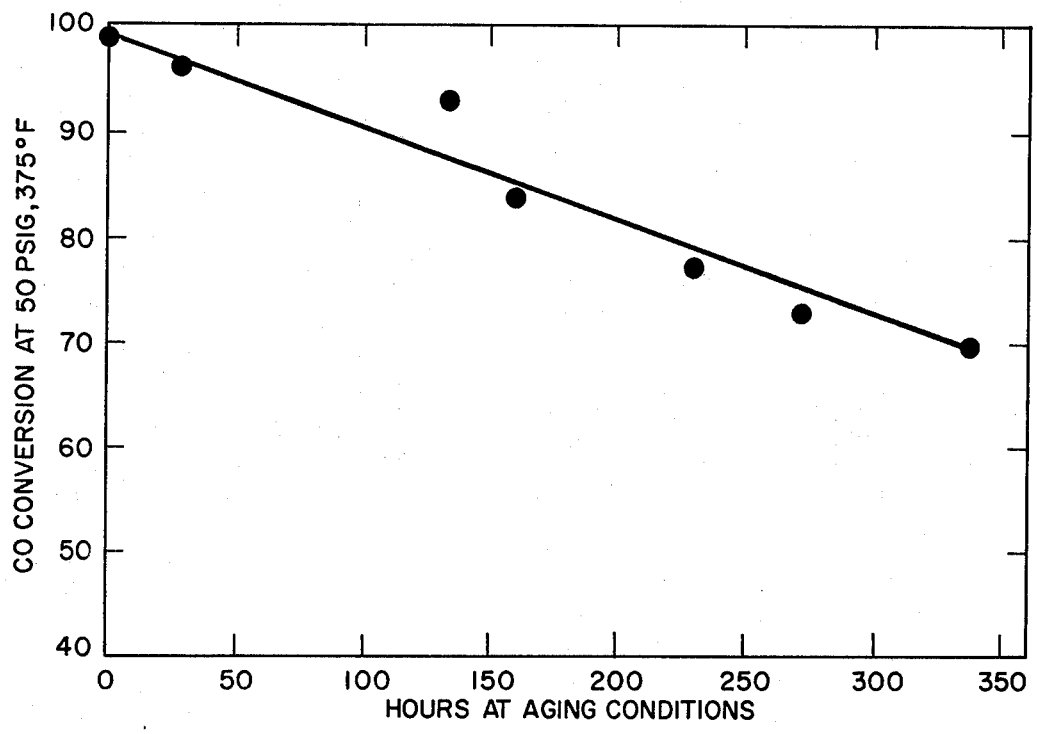
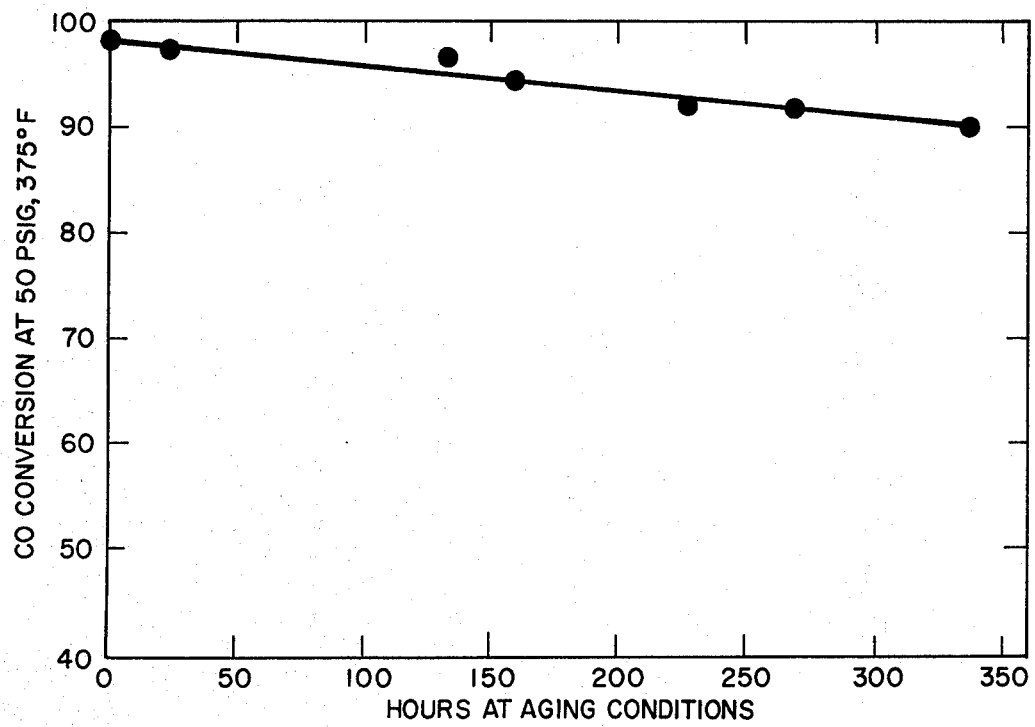

WATER GAS SHIFT CATALYST

CROSS REFERENCE TO RELATED CASES

This is a division of application Ser. No. 235,178, filed Mar. 16, 1972, now abandoned.

BACKGROUND OF THE INVENTION

1. Field of the Invention

This invention relates to a process for producing hydrogen by reacting carbon monoxide with steam at elevated temperatures in the presence of a catalyst containing at least one alkali metal compound, at least one metal hydrogenation-dehydrogenation component and a halogen moiety. More particularly, the invention relates to an improved water gas shift catalyst that contains a halogen constituent, preferably chemically combined chlorine, in combination with an alkali metal salt derived from a weak acid and at least one metal hydrogenation-dehydrogenation component and processes utilizing the chlorine-containing catalyst for the production of hydrogen.

2. Description of the Prior Art

The water gas shift reaction is widely used in commerce and is typically promoted with catalysts based on combinations of iron oxide with chromia or mixtures of copper and zinc materials. The currently used commercial shift catalysts suffer from a number of deficiencies, the principal deficiency being the inability of the available catalysts to promote the shift reaction to high conversion levels when the process is conducted at low temperatures in the presence of sulfur and/or halogen impurities.

One of the inventors named herein has discovered that the problems encountered with the use of prior art water gas shift catalysts could be overcome by utilizing a shift catalyst based on a combination of an alkali metal compound derived from an acid having an ionization constant less than about $1 \times 10^{-3}$ with at least one metal hydrogenation-dehydrogenation component. It was found that unusually effective results could be secured with this catalyst when the weight ratio of the hydrogenation-dehydrogenation component to the alkali metal compound, each measured on the basis of the oxide thereof, present in the catalyst is maintained at levels of less than about 10 : 1, preferably less than about 5 : 1, and most preferably less than 3 : 1. The activity of this type of catalyst was found to be further enhanced when at least a portion of metal hydrogenation-dehydrogenation component and/or alkali metal compound are present in the catalyst in a sulfide form. However, the very high activity level secured with the sulfided catalyst slowly degrades with use unless the feedstock being processed contains at least minor amounts of sulfur constituents.

Shift catalysts containing metallic hydrogenation-dehydrogenation components in combination with minor amounts of alkali metal materials have been described in British Pat. No. 961,860 and U.S. Pat. No. 3,529,935. Numerous other references exist that disclose catalyst combinations made up of heavy metal compositions in conjunction with an alkali material. Exemplary of such teachings are the disclosures of Switzerland Pat. No. 69,336; U.S. Pat. Nos. 1,330,772; 3,518,208; 3,490,872; 1,896,840; 2,147,780; 2,364,562; Ztschr. Elektrochem 44 (1938), pp. 577–578; Netherlands application No. 66,01536; Japanese Pat. No. 129,729; Russian Pat. No. 67,942; French Pat. Nos. 777,546 and 815,351; Austrian Pat. Nos. 149,657 and 153,165; German Pat. No. 706,868; Belgian Pat. No. 659,421 and Simck et al., Zprary Ustava Ved. Vyk. Uhli Praze, 2 (1935) pp. 113–128 (see also Chem. Abs., 30 (1936)).

BRIEF DESCRIPTION OF THE FIGURES

FIG. 1 depicts the decline in catalyst activity encountered processing a sulfur-free feedstock with a cobalt-molybdenum/potassium carbonate based catalyst.

FIG. 2 illustrates the decline in catalyst activity noted processing a sulfur-free feedstock with a chlorine promoted, cobalt-molybdenum/potassium carbonate based catalyst.

SUMMARY OF THE INVENTION

It has now been found that the activity maintenance characteristics of alkali metal salt/hydrogenation-dehydrogenation component based catalysts when used to process carbon monoxide feedstocks that contain less than about 200 vppm sulfur materials, can be markedly improved by incorporating minor amounts of halogen, preferably chlorine into the catalyst. Accordingly, gas mixtures containing carbon monoxide and little or no sulfur materials ($H_2S$, organic sulfides, etc.) can be converted to hydrogen by reaction with steam at a temperature of at least about 200°F. in the presence of a catalyst comprising (1) at least one alkali metal compound (Group IA compound), said compound being derived from an acid having an ionization constant of less than about $1 \times 10^{-3}$, (2) a metallic hydrogenation-dehydrogenation component, and (3) a halogen moiety, preferably a chlorine moiety. Desirably, the active catalyst components are contained on a porous inorganic oxide support material.

According to the present invention, carbon monoxide is reacted with steam to produce hydrogen and carbon dioxide. The carbon monoxide reactant may be admixed with hydrogen, carbon dioxide, nitrogen, nitrous oxides, as well as minor amounts of hydrocarbon and/or hydrocarbon conversion byproducts. The carbon monoxide stream may also contain minor quantities of sulfur and/or halogen-containing materials. The present catalyst systems function best when the gas stream being treated contains at least about 0.1 vppm of sulfur materials. The carbon monoxide-containing stream should not contain inordinately large amounts of halogen, since excessive amounts of halogen could react with and deactivate all of the needed alkali metal constituent of the catalyst. Typically, molar excesses of steam are used relative to the amount of carbon monoxide introduced into the reaction zone. Generally, from about 0.5 to 100, preferably from about 1.5 to 25, volumes of steam are used per volume of carbon monoxide reactant.

As noted earlier, the catalyst consists of an alkali metal compound, a hydrogenation-dehydrogenation component, and a halogen constituent. Suitable alkali metal components include the carbonates, bicarbonates, biphosphates, sulfides, silicates, bisulfides, aluminates, hydroxides, tungstates, etc. of sodium, potassium, nickel, rubidium or cesium. Further, the alkali metal salts of weak organic acids such as acetic acid or propionic acid may also be used. The alkali salt of any acid that has an ionization constant of less than about $1 \times 10^{-3}$ may be successfully used. The potassium and cesium salts, in particular, potassium and cesium carbonate, are most preferred. It has been found that at least a portion of the weak acid alkali metal salts used herein are converted to the corresponding alkali metal carbonate during the course of the shift reaction.

The hydrogenation-dehydrogenation component of the catalyst system is a Group VB, VIB or VIII metal or metal compound. The preferred catalyst species are (1) vanadium, molybdenum, cobalt, tungsten, tantalum or niobium alone or in admixture in any proportion and (2) vanadium, molybdenum, cobalt, tungsten, tantalum or niobium materials or mixtures thereof employed in combination with nickel, iron or chromium materials or mixtures thereof. Examples of useful hydrogenation-dehydrogenation catalyst components include a molybdenum-chromium, tungsten-chromium, cobalt-nickel, cobalt-iron, molybdenum-tungsten, vanadium-tungsten, vanadium-cobalt, cobalt-molybdenum, nickel-tungsten, cobalt, vanadium, molybdenum, cobalt-nickel-molybdenum, cobalt-iron-molybdenum, tantalum-tungsten, cobalt-niobium, cobalt-iron-tantalum, vanadium-molybdenum, etc.

The hydrogenation-dehydrogenation metals are initially present on the catalyst in the metallic form or in a compound form, preferably a compound form that is easily converted at least partially to the corresponding sulfide. The chemical form of the catalyst metal materials (hydrogenation-dehydrogenation components) is not critical. Preferably the catalyst metal materials are in a form that can be at least partially reduced and/or sulfided under shift reaction conditions. Hereinafter, the hydrogenation-dehydrogenation component of the catalyst will be referred to as the metal without reference to its actual chemical state during the course of the shift reaction. Under reaction conditions, the catalyst metals are believed to exist in a partially reduced and/or sulfided state which is difficult to define stoichiometrically.

The final major catalyst constituent is a halogen component. As noted above, the presence of a halogen constituent in the catalyst serves to markedly enhance the activity maintenance characteristics of the catalyst. The preferred halogen specie is chlorine. Precisely how the chlorine constituent functions in the catalyst is not known. Similarly, the exact chemical state of the halogen constituent of the catalyst is not known. It is believed that the halogen is present in a chemically combined form in the catalyst. It is also believed that the location of the halogen moiety on the catalyst is not critical. Accordingly, the chlorine may be combined with the alkali metal constituent or the hydrogenation-dehydrogenation component. Further, the chlorine may be chemically combined with the catalyst support material, when used, or alternatively adsorbed onto the surface of the catalyst support. Preferably, the finished catalyst contains at least about 0.01 weight percent halogen, preferably in the range of from about 0.01 to 5.0 weight % halogen. Most preferably the catalyst contains from about 0.1 to 3.0 wt. % halogen.

The active catalyst constituents may be used alone or contained on a support or carrier material. The chemical identity of the carrier is not critical. Suitable carrier compositions include alumina, especially gamma and alpha alumina, silica, silica-alumina mixtures such as silica-alumina cogel cracking catalysts, zeolite materials such as faujasite, erionite, and the like; activated carbon, cocoanut-charcoal, magnesia, titania, zirconia, etc. The preferred catalyst supports are porous inorganic oxides such as gamma and alpha alumina.

The catalyst components can be added to the support in any conventional manner. Preferably, the hydrogenation-dehydrogenation components are placed on the support first and the combination calcined at a temperature varying from about 1000° to 1200°F. to convert the metal materials to the easily sulfided oxide form. Then the alkali metal constituent is impregnated onto the support using aqueous or alcoholic media and the catalyst dried. Finally, the desired halogen moiety is introduced by mixing the partially prepared catalyst with a 0.1 normal aqueous solution of hydrogen halide, preferably hydrogen chloride. A sufficient quantity of the hydrogen halide solution is used to totally wet the partially prepared catalyst. Following this procedure, the catalyst is again dried and the hydrogen halide impregnation repeated until sufficient amounts of halogen are placed on the catalyst.

As an alternate to the above procedure, the catalyst may be prepared by dry mixing the various catalyst components. Good catalysts can be obtained by milling the supported hydrogenation-dehydrogenation component with powdered alkali metal component. The resultant mixture, after the addition of a lubricant, such as stearic acid or graphite, can be compressed into pellets which can be substantially calcined and then treated with hydrogen halide. As an alternate to hydrogen halide treatment, the support material used can, prior to introduction of other catalyst constituents, be treated with an alkyl halide, such as carbon tetrachloride or tetrachloroethylene, to introduce halogen into the support structure. Further, the desired amount of combined halogen can be introduced into the catalyst by incorporating an inorganic halide into the catalyst system or treating the completed catalyst with a halogen containing gas either prior to or during use of the catalyst.

The weight ratio of hydrogenation-dehydrogenation component to alkali metal compound present in the catalyst is critical to the ultimate performance of the catalyst. Maximum catalyst activity is encountered when the ratio of metal component to alkali metal compound is less than 10:1, preferably less than about 5:1, most preferably less than about 3:1, the weight ratios being calculated on the basis of the oxides of each constituent. Typically, from about 0.001 to about 5–10 parts by weight of hydrogenation-dehydrogenation component is used per part by weight of alkali metal compound. For purposes of calculating weight ratios, the metals are assumed to exist in only the following oxide forms, $CoO$, $MoO_3$, $WO_3$, $V_2O_5$, $Fe_2O_3$, $NiO$, $Cr_2O_3$, $Ta_2O_5$ and $Nb_2O_5$.

The precise amount of hydrogenation-dehydrogenation component used in the catalyst is not critical. Typically, a supported catalyst will be composed of about 0.1 to 35 wt. %, preferably 5 to 20 wt. % of the hydrogenation-dehydrogenation component measured on the basis of the oxide thereof. Sufficient amounts of alkali metal compound and halogen are added to reach the concentrations previously specified. When mixtures of vanadium, molybdenum, tungsten, cobalt, tantalum or niobium are used, the ratio of any given metal material to the total metal content is not critical. However, when iron, nickel or chromium are used in combination with vanadium, molybdenum, cobalt, tungsten, tantalum or niobium, the nickel, iron or chromium constituent should make up less than about 80 mole %, preferably less than about 50 mole % of the total hydrogenation-dehydrogenation component present. The preferred hydrogenation-dehydrogenation component is a mixture of cobalt and molybdenum materials. Typically, when such a mixture is used, the total catalyst is composed of about 0.1 to 10 wt. %, preferably about 1 to about 5 wt. % cobalt material (oxide basis) and from about 1 to 25 wt. %, preferably from about 5 to 15 wt. % molybdenum material (oxide basis).

The present catalyst system is particularly effective when at least a portion of hydrogenation-dehydrogenation component and/or alkali compound are in a sulfide form. The catalyst metals may be sulfided after catalyst formation and prior to contact with the process reactants. Alternatively, the hydrogenation-dehydrogenation and/or alkali metals may be sulfided, in situ, through contact with sulfur-bearing constituents present in the process feedstock. It should be recognized that the catalysts of the present invention are effective shift reaction promoters when the hydrogenation-dehydrogenation metal and/or alkali metal constituents are not present in a sulfide form. Generally, however, the conversion of any part of the catalyst metals to a sulfide form will have a beneficial effect on shift catalyst activity.

A preferred laboratory metals sulfiding procedure consists of contacting a 10 cubic centimeter volume of catalyst with a feed gas mixture composed of approximately 52 volume percent carbon monoxide, 47 volume percent hydrogen and about 1 volume percent hydrogen sulfide. The feed gas mixture is passed through the reactor containing the catalyst at a rate such as to maintain an exit dry gas product rate of 2700 volumes per volume of catalyst per hour as measured at room temperature and atmospheric pressure (standard conditions). This feed gas mixture is initially passed over the catalyst at the above rate for about 110 minutes at 250°F. and at atmospheric pressure. Thereafter, the catalyst bed is gradually heated from 250° to 625°F. over a period of about 135 minutes. During this period, the catalyst is continuously contacted with the feed gas mixture at the rate indicated at atmospheric pressure. The 625°F. temperature level is then maintained for an additional 130 minutes while continuing the contacting of the catalyst with the gas mixture at atmospheric pressure. Thereafter, the reaction zone pressure is raised to 75 lbs. per square inch (p.s.i.g.) and the feed gas introduced into the system at 625°F. for 30 minutes at a gas rate of about 4200 volumes of feed gas at standard conditions per volume of catalyst per hour. The reactor is then pressurized to 550 p.s.i.g. and the feed gas introduced in the previously described rate for an additional 60 minutes. Finally, steam is admixed with the feed gas at a rate of about one mole of steam per mole of dry product gas and the temperature of the system maintained at 550 p.s.i.g. and 625°F. Further information concerning shift catalysts that contain an alkali metal component and a hydrogenation-dehydrogenation component is present in copending application, Ser. No. 152,584, filed June 14, 1971, the disclosures of which are herein incorporated by reference.

The shift process and the process conditions used to secure high conversions of carbon monoxide to hydrogen are well known to those skilled in the art. Preferably, the shift process is carried out in a continuous mode with the reactants being passed over a fixed or fluid bed of catalyst contained in one or more reaction zones. Gaseous hourly space velocities of at least 300 volumes of feed per volume of support catalyst per hour (V/V/Hr.) are used. Preferably, space velocities of between about 300 to 3,000 V/V/Hr., measured on the basis of dry gas under standard conditions are particularly suitable for most commercial operations. However, higher gaseous hourly space velocities may be employed.

With the catalyst of the present invention, the carbon monoxide containing stream and the steam co-reactant are passed over the shift catalyst at temperatures varying between about 200° and 950°F., preferably at temperatures ranging from 250° to 700°F., the temperature of the reaction mixture in contact with the catalyst being maintained above the dew point temperature of the reaction mixture. Reaction zone pressure is maintained below the dew point pressure of the reaction mixture and in the range of from about 200 to 1500 p.s.i.g. It should be recognized that lower or higher reaction zone pressures can be used such as from atmospheric up to about 3000 p.s.i.g. As noted earlier, the process is particularly effective when the feedstock contains minor amounts (at least about 0.1 vppm) of sulfur-bearing compounds since the presence of sulfur serves to maintain catalyst activities at extremely high levels.

The use of the catalyst system of the present invention leads to extremely high heat release. In view of this factor, process equipment design will have to account for this physical fact. Heat problems may be avoided with the use of a fluidized system. If a fixed bed process is used, the high heat release may be accommodated by the use of an inert diluent or by pseudo staging of the catalyst beds by diluting the catalyst along the length of the catalyst beds.

The present catalyst system can be used in various types of process configurations. For example, the catalyst may be employed in a low temperature reaction stage following a high temperature reaction stage wherein a conventional sulfur resistant, high temperature shift catalyst is employed. Alternatively, the catalyst may be employed in a plurality of low temperature reaction stages wherein the product stream is cooled between stages. Further information relating to methods of utilizing catalysts of the type claimed herein is present in U.S. Pat. Nos. 3,850,840 and 3,850,841, the disclosures of which are incorporated herein by reference.

DESCRIPTION OF THE PREFERRED EMBODIMENT

To demonstrate the improved activity maintenance characteristics of the present chlorine-containing shift catalyst, a test series was conducted in which two catalysts identical in every respect, except that one catalyst contained 0.7 weight % combined chlorine at the start of the run, were each used to promote a shift reaction wherein the process feedstock contained sulfur and then used to promote shift reaction wherein the feedstock was sulfur-free. The decline in activity of the two catalysts during the period of sulfur-free operation is represented in FIGS. 1 and 2.

The catalysts used in the tests initially consisted of 3.0 weight % cobalt oxide, 10.8 weight % molybdenum trioxide and 13.5 weight % potassium carbonate contained on gamma alumina. As noted above, the chlorine-containing catalyst additionally contained 0.7 weight % chlorine. The chlorine-containing catalyst was prepared by admixing the basic cobalt oxide/molybdenum trioxide/potassium carbonate/alumina catalyst with a sufficient quantity of 0.1 normal aqueous hydrogen chloride to wet the catalyst. Thereafter, the catalyst was oven dried in air at a temperature varying between about 120°–150°C. This treatment operation was repeated until about 0.7 weight % chlorine, based on final catalyst, was secured. Ten cubic centimeters of each of the catalysts, as 20–40 mesh particles, were charged in combination with 10.9 grams of mullite to a tubular reactor having a 10:1 length diameter ratio. Both reactors used were positioned within the same sand bath. After the reactors were loaded, both catalysts were sulfided utilizing the previously described laboratory sulfiding procedure. Thereafter, a process feedstock consisting of about 89–90 mole % hydrogen, about 9–10 mole % carbon monixide, and from about 0.15 to 1.0 volume % hydrogen sulfide was passed over the catalyst in combination with about 0.6–0.8 mole of steam per mole of exit dry gas. The test was conducted for about 43 days at typical aging conditions, that is, at about 550°F. and 600 p.s.i.g. At day 44, the hydrogen sulfide was removed from the feedstock and the test continued for an additional 335 hours. During this period, the reaction conditions were periodically cycled from about 560°F. and 600 lbs. pressure to 375°F. and 50 p.s.i.g. pressure. The steam/exit dry gas molar ratio varied between 0.66 to 0.83 and the space velocity (V/Hr./V) ranged from about 3166 3964 during the test period. Samples of the effluent gas were taken periodically and carbon monoxide conversions determined.

As is evident from FIGS. 1 and 2 the catalyst containing chemically combined chlorine deactivated in a sulfur free atmosphere at a significantly slower rate than the same catalyst that did not contain the chlorine additive.

What is claimed is:
1. An improved catalyst composition comprising, in combination, a support material containing (i) alkali metal sulfide, alkali metal bisulfide, alkali metal hydroxide or salt of an alkali metal derived from an acid having an ionization constant less than $1 \times 10^{-3}$, (ii) a hydrogenation-dehydrogenation component selected from the group consisting of (a) a non-noble metal composition comprising an oxide or a sulfide of vanadium, molybdenum, tungsten, cobalt, tantalum or niobium or mixtures thereof of (b) mixtures of non-noble metal materials comprising an oxide or a sulfide of vanadium, molybdenum, tungsten, cobalt, tantalum or niobium or mixtures thereof with an oxide or a sulfide of nickel, iron or chromium or mixtures thereof, and (iii) a halogen moiety, the weight ratio of said hydrogenation-dehydrogenation component to said alkali metal sulfide, bisulfide, hydroxide or salt, each calculated on the basis of the oxide thereof, being less than about 10:1.

2. The composition of claim 1 wherein said halogen moiety is chlorine.

3. The composition of claim 1 wherein said alkali metal salt is an alkali metal carbonate.

4. The composition of claim 2 wherein said alkali metal salt is potassium carbonate.

5. The composition of claim 2 wherein said hydrogenation-dehydrogenation component is a mixture of cobalt oxide and molybdenum oxide or a mixture of cobalt sulfide and molybdenum sulfide.

6. The composition of claim 2 wherein said support is alumina.

* * * * *

UNITED STATES PATENT OFFICE
CERTIFICATE OF CORRECTION

PATENT NO. : 3,974,096
DATED : August 10, 1976
INVENTOR(S) : Marnell A. Segura et al It is certified that error appears in the above-identified patent and that said Letters Patent are hereby corrected as shown below:

At column 8, line 11, after "thereof" delete "of" and insert in place thereof -- or --.

Signed and Sealed this

Twenty-fourth Day of May 1977

[SEAL]

Attest:

RUTH C. MASON
Attesting Officer

C. MARSHALL DANN
Commissioner of Patents and Trademarks